Sept. 3, 1963  B. E. ETTER  3,102,932
IGNITION LOCKING DEVICE FOR VEHICLE IGNITION SYSTEMS
Original Filed March 14, 1960  3 Sheets-Sheet 1

Inventor
Berwyn E. Etter
by Donald H. Zarley
Attorney

Sept. 3, 1963 B. E. ETTER 3,102,932
IGNITION LOCKING DEVICE FOR VEHICLE IGNITION SYSTEMS
Original Filed March 14, 1960 3 Sheets-Sheet 2

Witness
Edward P. Seeley

Inventor
Berwyn E. Etter
by Donald H. Zarley
Attorney

Sept. 3, 1963  B. E. ETTER  3,102,932
IGNITION LOCKING DEVICE FOR VEHICLE IGNITION SYSTEMS
Original Filed March 14, 1960  3 Sheets-Sheet 3
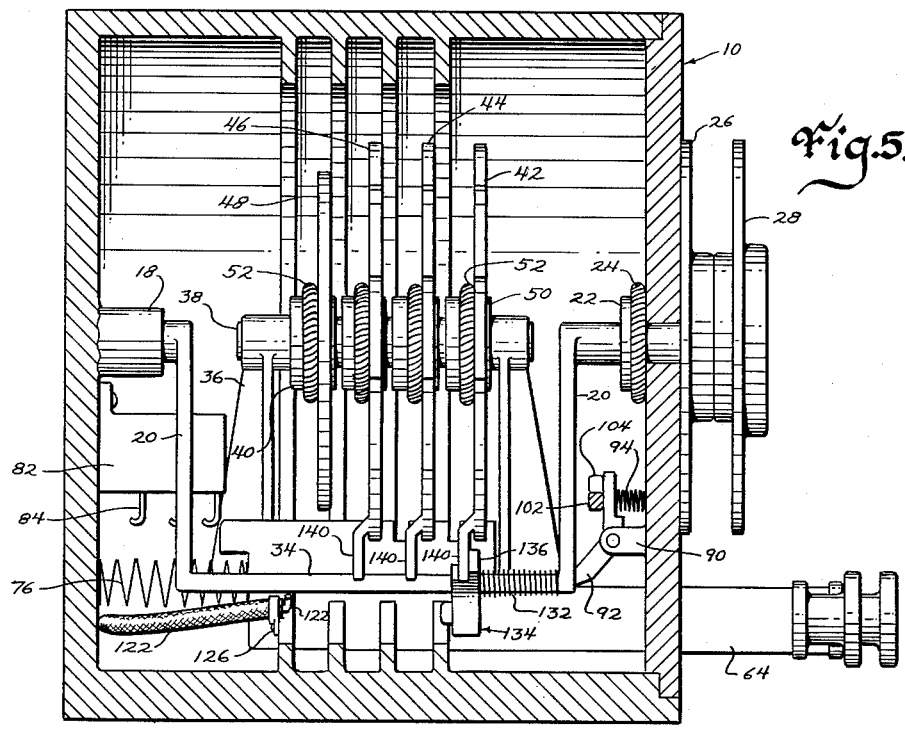
Fig.5.
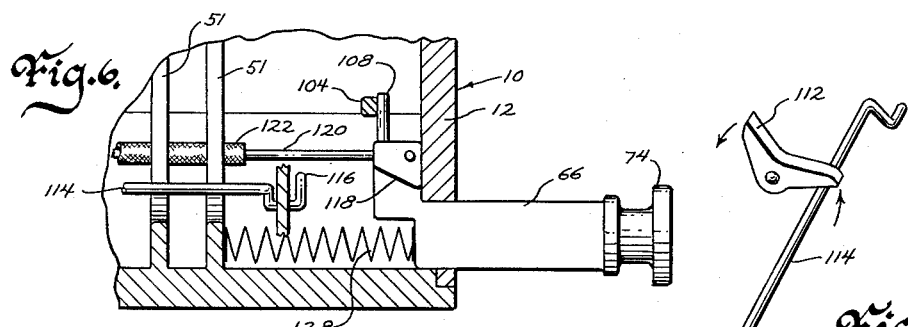
Fig.6.
Fig.7.
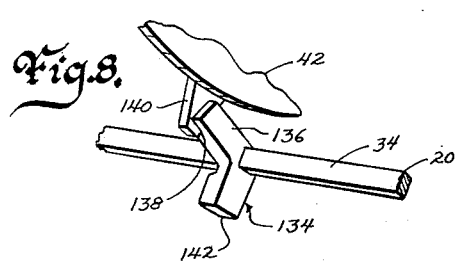
Fig.8.
Witness
Edward P. Seeley
Inventor
Berwyn E. Etter
by Donald H. Zarley
Attorney

United States Patent Office 3,102,932
Patented Sept. 3, 1963

3,102,932
IGNITION LOCKING DEVICE FOR VEHICLE
IGNITION SYSTEMS
Berwyn E. Etter, 6065 22nd Ave. N.,
St. Petersburg, Fla.
Continuation of application Ser. No. 14,875, Mar. 14, 1960. This application Jan. 2, 1962, Ser. No. 165,060
7 Claims. (Cl. 200—42)

My invention relates to locking devices and more particularly to a locking device for the ignition system of a motor vehicle. This application is a continuation of my application, Serial No. 14,875, filed March 14, 1960, now abandoned, on an identical device.

Ignition systems of motor vehicles are commonly locked and unlocked with a conventional key. Such locks are easier to "pick" than combination locks and because keys can assume only a limited number of shapes, a single key can usually unlock at least one out of each fifty ignitions in a given make automobile. Also, the loss of a key by the operator often makes time consuming and sometimes expensive delays. Combination locks, even if adaptable to ignition systems, have the inherent shortcoming of reacting when moved to their various unlocked positions, thus permitting one to "feel" the unlocked positions even though these positions were not known beforehand.

Therefore, the principal object of my invention is to provide a locking device for ignition systems that can be unlocked only through the operation of a dial mechanism.

A further object of my invention is to provide a locking device for ignition systems that can be easily locked and which will easily permit the normal ignition system to function when in an unlocked position.

A further object of my invention is to provide a locking device for ignition systems that will disguise the unlocking combination.

A still further object of my invention is to provide a locking device for ignition systems that is economical of manufacture, durable in use and refined in appearance.

These and other objects will be apparent to those skilled in the art.

My invention consists in the construction, arrangements, and combination, of the various parts of the device, whereby the objects contemplated are attained as hereinafter more fully set forth, specifically pointed out in my claims, and illustrated in the accompanying drawings, in which:

FIG. 5 is a sectional view of my device taken on line 5—5 of FIG. 4;

FIG. 6 is a partial sectional view of my device taken on line 6—6 of FIG. 4;

FIG. 7 is a partial perspective view of my ratchet control arm; and

FIG. 8 is a partial perspective view of my locking wheel drive element.

Figure 1:
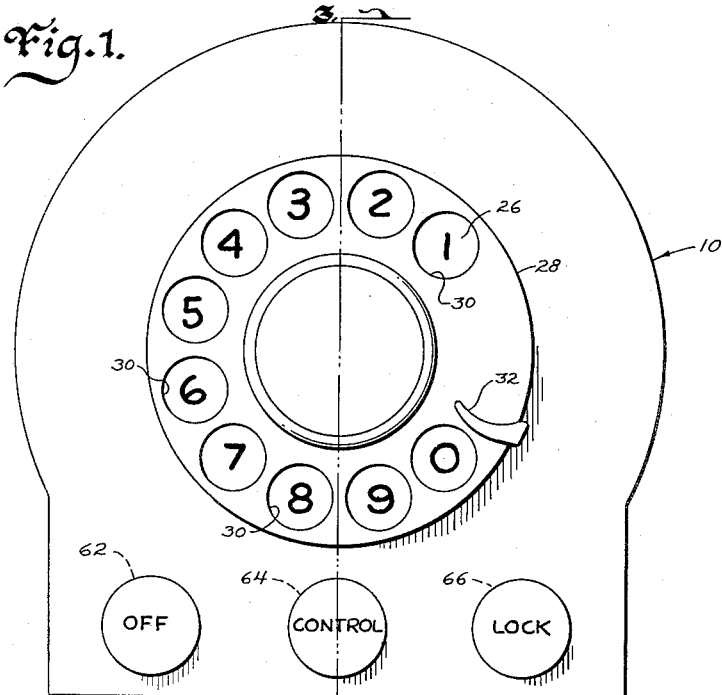
FIG. 1 is a frontal elevation of my device.
Figure 3:
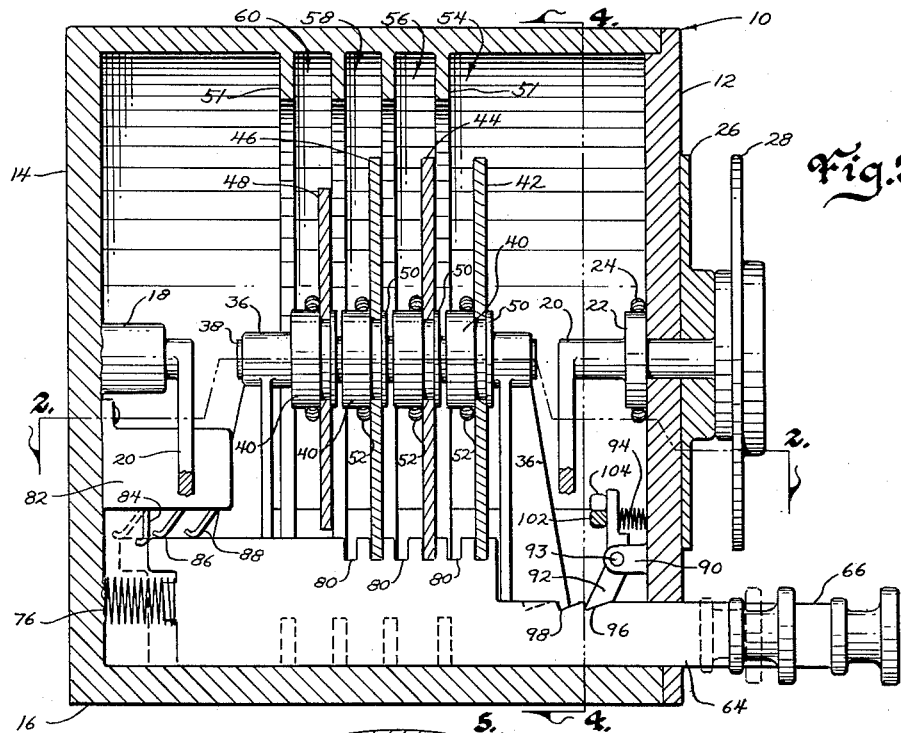
FIG. 3 is a sectional view of my device taken on line 3—3 of FIG. 1.

I have used the numeral 10 to generally designate a housing which is substantially cylindrical in shape with forward end 12, rearward end 14 and bottom 16. A bearing element 18 extends inwardly from the rearward end 14 of the housing and is positioned substantially on the longitudinal axis thereof. A U-shaped crankshaft 20 has one of its ends rotatably mounted in bearing element 18 and its other end rotatably protruding through a suitable bore in the frontward end 12 of the housing 10. A circular collar 22 is rigidly secured to crankshaft 20 adjacent the inner side of the frontward end 12 of housing 10. A coil spring element 24 extends around collar 22 and has one of its ends secured to the collar in any convenient fashion with the other end similarly secured to the inner side of the frontward end 12 of the housing. A circular plate 26 is rigidly secured to the outer side of end 12 and loosely embraces crankshaft 20. Numbers similar to those on a conventional telephone dial are located on the outer surfaces of plate 26. A dial 28 is rigidly secured to the outer protruding end of crankshaft 20 in spaced relation to plate 26, as shown in FIG. 3. Dial 28 has a plurality of apertures 30 that register with the numerals on plate 26. A clip 32 is rigidly secured to plate 26 and extends outwardly and over dial 28 as shown in FIG. 1. The numeral 34 designates the horizontal portion of the V-shaped crankshaft 20.

Figure 4:
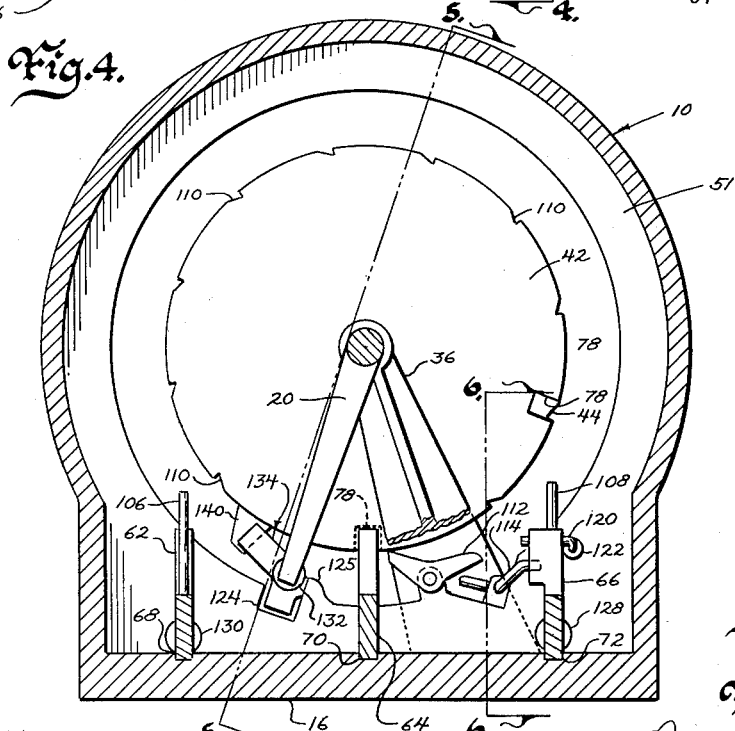
FIG. 4 is a sectional view of my device taken on line 4—4 of FIG. 3.

Legs 36 extend upwardly from the bottom 16 of housing 10 and terminate on the longitudinal axis of the housing. As shown in FIG. 4, legs 36 are located slightly to one side of the extreme center of the bottom 16. A shaft 38 is rigidly secured to and extends between the upper ends of legs 36 on the longitudinal axis of housing 10. Four circular collars 40 are rigidly secured in spaced apart relation on shaft 38. Locking discs 42, 44, 46 and 48 are rotatably mounted on shaft 38 adjacent the respective forward sides of collars 40. Washers 50 are rigidly secured in any convenient fashion at positions just forwardly of each of the locking discs to confine the rotational positions of the discs at points just forwardly of their respective collars 40. Coil springs 52, similar to coil spring 24, are mounted around collars 40 and have one of their ends secured to the collars and their other ends secured in any convenient fashion to the adjacent locking disc. As shown in FIG. 4, parallel webs 51 extend inwardly a short distance from housing 10 to form grooves 54, 56, 58 and 60. Webs 51 are so spaced that the locking discs 42, 44, 46 and 48 dwell within the planes of grooves 54, 56, 58 and 60, respectively.

Bars 62, 64 and 66 slidably pass through appropriate openings in the forward end 12 of housing 10 and along elongated grooves 68, 70 and 72, respectively, on the upper surface of the bottom 16 of the housing. Each of the bars 62, 64 and 66 have knobs 74 on its forward end to facilitate manual movement thereof.

Bar 64 is a control bar and is normally urged outwardly from the front of housing 10 by coil spring 76 which is disposed between the rearward end of bar 64 and the rearward end 14 of housing 10. Bar 64 intersects the locking discs 42, 44 and 46 and is permitted to slide within housing 10 only when the notches 78 in locking discs 42, 44 and 48 are in alignment. The notch 78 in disc 42 is shown in FIG. 4. Disc 48 is of smaller diameter than the other locking discs, and since it always clears bar 64, as shown in FIG. 3, it has no notch 78. Bar 64 has a plurality of vertically disposed notches 80 in its upper edge, as shown in FIG. 3, which are spaced apart the same distances that separate locking discs 42, 44 and 46, so that when the notches 80 in the bar register with the discs, the discs can be rotated on shaft 38.

A switch box 82 is secured in any convenient manner to the rearward end 14 of housing 10 at a point above bar 64. Three switches 84, 86 and 88 extend downwardly into the normal sliding path of bar 84 and are normally open when vertically disposed. Switch 84 is imposed in the circuit containing the vehicle accessories such as a radio and heater; switch 86 is the ignition switch and switch 88 is imposed in the starting motor circuit. Each of the three switches is closed when moved out of its vertical and open position by the rearward movement of bar 64, as shown in FIG. 3.

Ears 90 extend inwardly from the forward ends 12 of housing 10 at a point above bar 64 and ratchet 92 is pivotally secured therebetween at its midpoint by pin 93. Coil spring 94 is imposed between the upper end of ratchet 92 and the inner side of the forward end 12 of housing 10 to normally urge the ratchet to pivot in a counterclockwise direction as viewed in FIG. 3. As also shown in FIG. 3, the upper edge of bar 64 has ratchet notches 96 and 98 which are adapted to receive the lower end of ratchet 92 at times. The notches 96 and 98 cooperate with ratchet 92 to yieldingly prevent the forward or outward sliding movement of bar 64 in housing 10 at times. The notch 98 is so located on bar 64 that it will receive ratchet 92 whenever bar 64 closes only switch 88. The notch 96 is adapted to receive ratchet 92 whenever bar 64 closes both of the switches 86 and 88. This latter phenomenon is illustrated in FIG. 3.

Figure 2:
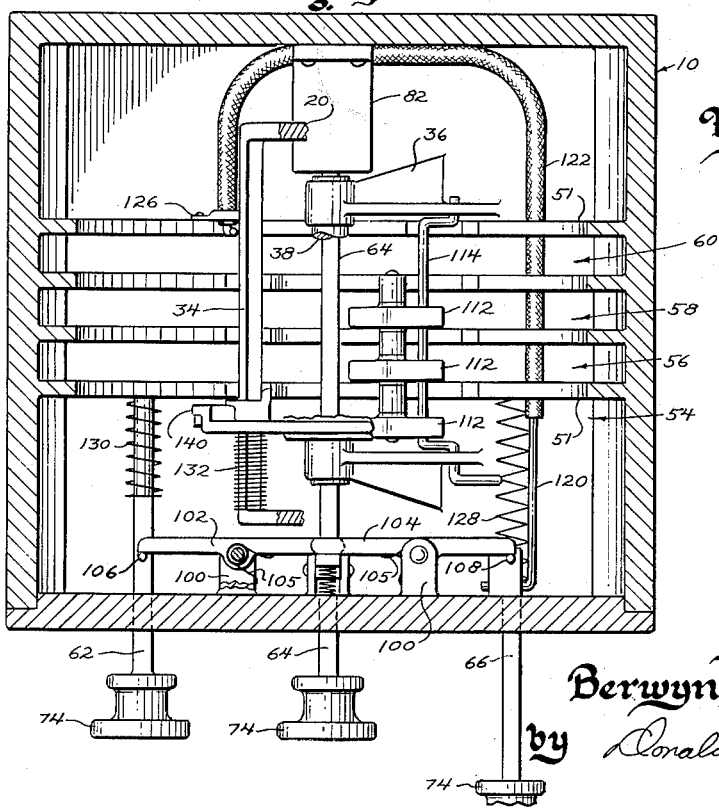
FIG. 2 is a sectional view of my device taken on line 2—2 of FIG. 3.

Pairs of ears 100 extend inwardly from the forward end 12 of housing 10 at a point above the level of ears 90. Horizontal arms 102 and 104 are pivoted by their midpoints in a horizontal plane between each respective pair of ears as shown in FIG. 2. Arm 102 extends from a point over bar 62 to a point directly in the rear of the upper end of ratchet 92. Arm 104 is mounted just above arm 102 and extends from a point over bar 66 to a point directly in the rear of the upper end of ratchet 92. Springs 105 have their respective ends secured to ears 100 and one of the arms 102 or 104 to yieldingly hold the arms in a transverse position within housing 10. Vertical pins 106 and 108 in bars 62 and 66, respectively, extend upwardly and engage the outer ends of the arms 102 and 104, respectively.

As shown in FIG. 4, each of the locking discs 42, 44 and 46 has a plurality of ratchet notches 110 on its respective periphery. A plurality of ratchets 112 are pivoted in any convenient manner to housing 10 between legs 36 and are adapted to individually engage one of the ratchet notches on the individual locking discs and to hold the disc against counterclockwise rotation at times as viewed in FIG. 4. The ratchets 110 are pivoted off center so that they normally have a tendency to pivot toward and engage the locking discs. A U-shaped ratchet control arm 114 is pivotally connected in any convenient manner to housing 10 and extends underneath one end of the ratchets 112 so that the upward movement of the arm will cause the ratchets 112 to pivot out of engagement with the notches 110 in the locking discs. The forward end of control arm 114 has a protruding tip 116 which is adapted to engage and be depressed by the cam surface 118 on the rearward end of bar 66, as will be described hereafter.

As shown in FIGS. 2 and 4, one end of flexible cable 120 is secured to the rearward end of bar 66 and movably extends through a conduit 122 which terminates near the rearward end of housing 10. An elongated groove 124 extends longitudinally along the inside surface of housing 10 and passes through the lower portions of webs 151. Shoulder 125 extends along the lowermost edge of groove 124 on webs 51. Conduit 122 is secured to the rearmost web 51 by clasp 126 at a point adjacent the rearward end of groove 124. Cable 120 is of such length that when the bar 66 is in its retracted position (FIG. 2), the rearward end of cable 120 substantially coincides with the rearward end of conduit 122. Coil spring 128 which extends between the rearward end of bar 66 and the rearwardmost web 51, normally yieldingly holds bar 66 in an outwardly extended position from the forward end 12 of housing 10. Spring 130 serves in the same manner and for the same purpose with respect to bar 62.

The horizontal portion 34 of U-shaped crankshaft 20 is square in cross section. A coil spring 132 embraces the forward end of portion 34 and yieldingly urges link 134, which is slidably mounted thereon, to a rearward position on the horizontal portion. Link 134 has a tongue 136 which extends into the clearance space between the locking discs and the protruding webs 51. A notch 138 on the rearward tip of tongue 136 is adapted to receive the driving lugs 140 which are secured to each of the locking discs 42, 44, 46 and 48. The driving lugs 140 are secured to the respective discs in such a position that they will assume the position shown in FIG. 4 at all times when the discs are in their locked positions. A lug 142 on link 134 extends downwardly into groove 124 as shown in FIG. 4.

The normal operation of my device is as follows: When the vehicle is not operating and is not locked, all three bars 62, 64 and 66 are resting in their outer or extended positions by springs 130, 76 and 128, respectively. When the operator wishes to use some of his accessories, such as the radio for example, the "control" bar 64 can be pushed inwardly into housing 10. As soon as notch 98 in bar 64 passes under ratchet 92, spring 94 will force the lower end of the ratchet into the notch. The operator can then release the bar 64 and the ratchet 92 will not permit the spring 76 to again force the bar 64 outwardly. As described above, the bar 64, when held in this position, will engage and close only the switch 88 and only the "accessory" circuit of the vehicle will be closed. When the operator desires to open the accessory circuit, he merely pushes the "off" bar 62 inwardly into housing 10. As shown in FIG. 2, the pin 106 on bar 62 overcomes the spring 105 on arm 102 and causes the arm 102 to pivot the upper end of ratchet 92 toward the forward end 12 of housing 10. This pivots ratchet 92 out of engagement with the notch 98 in bar 64 and spring 76 immediately forces bar 64 outwardly and out of engagement with switch 88. Upon the release of bar 62, spring 130 also returns the "off" bar 62 to its initial extended position.

When the operator wishes to start the vehicle, the control bar 64 is pushed inwardly to the extreme position shown by the dotted lines in FIG. 3. The bar 64 will thereupon engage and close all the three switches 84, 86 and 88. As soon as the vehicle is started, through the closing of the ignition and starting motor switches 84 and 86, the operator can then release the control bar 64 and it will be forced outwardly by spring 76 until ratchet 92 drops into the second notch 96 in the bar. As described above, this action maintains the bar 64 in a position where only the switches 86 and 88 are closed.

The operating vehicle can be shut off by pushing the "off" bar 62 which releases the control bar 64 in the same manner described above. However, if the operator desires to lock the ignition, the "locking" bar 66 should be pushed inwardly. If the control bar 64 has not already assumed its extended inoperative position by previously having pushed the "off" bar 62 in the manner described, the locking bar 66 accomplishes this phenomenon in the same manner that "off" bar 62 would have done it. The inward movement of the bar 66 causes pin 108 to engage and pivot arm 104, which in turn pivots ratchet 92 out of engagement with control bar 64, to permit the spring 76 to extend the bar 64 out of the housing 10.

At this point, it is again well to note that when my device is in its unlocked position, the locking discs 42, 44 and 46 have all been rotated against their respective springs 52 in a manner to be described so that their respective notches 78 are in alignment to permit the free passage of control bar 64 therethrough. The locking discs are held in this unlocked position by ratchets 112 which have engaged notches 110 in the discs to prevent the springs 52 from rotating the discs and disaligning the disc notches 78. Also, the link 134 is forced rearwardly on the horizontal portions 34 of U-shaped crankshaft 20 by the expansion of spring 132 when my device is in its unlocked condition. In this position, the link 134 would be abutting the rearward end of flexible cable 120, as this cable is viewed in FIGS. 2 and 5.

As the locking bar 66 continues its inward movement into housing 10, the flexible cable 120 is forced through conduit 122 and the rearward end of the cable thereupon moves forwardly against link 134 to compress spring 132 and to move the link to the position on the crankshaft shown in FIG. 5. As indicated above, the notches 80 in bar 64 registered with the notches 78 in the locking disc when the discs were unlocked and the bar 64 was in its outer position. At the last point of the inward movement of locking bar 66 into housing 10, the cam surface 118 on bar 66 engages the tip 116 of the ratchet control arm 114. This action causes the control arm 114 to pivot upwardly to lift the ratchets 112 out of engagement with their respective notches 110 in the respective locking discs. The locking discs 42, 44 and 46 are then free to be rotated to their normal locked positions by the contracting springs 52. Thus, each locking disc will rotate to its normal, locked position as depicted in FIG. 4. It should be noted that the springs 52 will normally hold the locking discs in this locked position with notches 78, upon being positioned differently in different discs, falling in a state of disalignment. Also, this normal locked position of the locking discs brings each of their driving lugs 140 into the same position shown by the driving lug 140 on disc 42 in FIG. 4. With the notches 78 in the locking discs 42, 44 and 46 being disaligned, the control bar 64 can be slidably moved "through" the discs to close any of the switches 84, 86 and 88, so the vehicle is effectively locked. The release of locking bar 66 will permit spring 128 to withdraw the forward end of cable 120 from conduit 122 by simultaneously forcing bar 66 outwardly from housing 10. The link 134 on the horizontal portion 34 of crankshaft 20 will not thereupon be moved forwardly on portion 34 by spring 132, for the driving lug 140 on locking disc 42 will have moved into the notch 138 on the tongue 136 to block the path of the link.

The spring 23, which yieldingly restrains the rotation of crankshaft 20, normally holds the crankshaft in the position shown in FIG. 4. To unlock my device, the operator must dial certain "numbers" which will move the locking discs 42, 44 and 46 into positions where the notches 78 therein will be in alignment. This will thereupon permit control bar 64 to be slidably operated within the housing 10 to close the desired switches.

With link 134 in engagement with the driving lug 140 on locking disc 42, the operator dials the "number" on dial 28 which will cause the crankshaft 20 and disc 42 to rotate a sufficient increment that the notch 78 in the disc will fall directly over the control bar 64. The "dial" positions on dial 28 are coordinated with the positions of notches 110 on the locking discs so that ratchets 112 will yieldingly hold the locking disc in the "dialed" position determined by the degree of rotation of crankshaft 20. After disc 42 has been "dialed" to its unlocked position, its ratchet 112 automatically engages its corresponding notch 110 and holds the disc in this unlocked position. The release of the dial 28 permits spring 24 to return the crankshaft 20 to its original position, leaving the disc 42 in its unlocked position. As link 134 disengages the driving lug 140 in disc 42, spring 132 tends to push the link rearwardly on the portion 34 of crankshaft 20. However, the forwardmost web 51 engages the lug 142 on link 134 to prevent this action and the link 134 rides within the groove 54, which is created by this web 51, until the crankshaft returns to its initial position. Upon the crankshaft being returned to its original position, which is depicted in FIG. 4, the lug 142 on link 134 escapes the confines of groove 54 and passes rearwardly into engagement with the driving lug 140 of the next locking disc 44. The procedure of unlocking the disc 42 is repeated with disc 44, but since the notch 78 in disc 44 is positioned differently than is the notch 78 in disc 42, a different number is dialed to move disc 44 to its unlocked position. After disc 44 is so unlocked, link 134 passes through groove 124 from the confines of groove 56 to engagement with driving lug 140 on disc 48 in the same manner that it moved from groove 54 to groove 56. After disc 48 is similarly unlocked with even a different number, link 134 thereupon moves to engagement with the fourth disc 48 which has no notch 78 and which needs none since its smaller diameter permits it to easily clear bar 64 at all times. However, for a would-be thief who does not know how many "numbers" are in the unlocking combination, the disc 48 serves as a "dummy" disc against which he can continue the dialing action without necessarily sensing that the unlocking combination is limited in digits to the preceding number of separate dialing operations. After the locking discs 42, 44 and 46 have been so "dialed" to their unlocked positions, which will align their notches 78 over control bar 64, the bar 64 can then be slidably moved in the manner described to operate switches 84, 86 and 88.

Obviously, my locking device would be useful in environments other than ignition systems, but its specific adaptation thereto is deemed to be particularly useful. Thus, from the foregoing, it is seen that my device will accomplish at least all of its stated objectives.

Some changes may be made in the construction and arrangement of my ignition locking device for vehicle ignition systems without departing from the real spirit and purpose of my invention, and it is my intention to cover by my claims, any modified forms of structure or use of mechanical equivalents which may be reasonably included within their scope.

I claim:
1. In a device of the class described,
a housing,
a switch in said housing and operatively electrically connected to an electrical circuit,
a control means movably mounted in said housing and having communication with the exterior thereof,
said control means adapted to be moved in said housing to actuate said switch at times,
locking means movably mounted in said housing and adapted to engage said control means at times to limit the movement of said control means at times,
a dial mechanism movably mounted on the outside of said housing,
yieldable means yieldably connecting said housing and said dial mechanism to resist the movement of said dial mechanism in one direction,
said yieldable means normally yieldably holding said dial mechanism in a predetermined position and normally returning said dial mechanism to this predetermined position whenever a displacing force on said dial mechanism has been removed,
and a means operatively connecting said dial and said locking means whereby the predetermined movement of said dial in said one direction will disengage said locking means from said control means.

2. In a device of the class described,
a housing,
a switch in said housing and operatively electrically connected to an electrical circuit,
a control means movably mounted in said housing and having communication with the exterior thereof,
said control means adapted to be moved in said housing to actuate said switch at times,
separate locking means movably mounted in said housing and adapted to engage said control means at times to limit the movement of said control means at times,
a dial mechanism movably mounted on the outside of said housing,
yieldable means yieldably connecting said housing and said dial mechanism to resist the movement of said dial mechanism in one direction,
said yieldable means normally yieldably holding said dial mechanism in a predetermined position and normally returning said dial mechanism to this predetermined position whenever a displacing force on said dial mechanism has been removed,
and a means operatively connecting said dial and said separate locking means whereby separate predetermined movements of said dial in said one direction will individually engage said separate locking means from said control means.

3. In a device of the class described,
a housing,
a switch in said housing and operatively electrically connected to an electrical circuit,
a control means movably mounted in said housing and having communication with the exterior thereof,
said control means adapted to be moved in said housing to actuate said switch at times,
axially aligned locking discs independently rotatably mounted in said housing and each adapted to engage said control means at times to limit the movement of said control means at times,
a U-shaped crankshaft rotatably mounted on said housing and adapted to rotate in spacer relation to the peripheries of said locking discs,
a link means movably mounted on said crankshaft and adapted to successively engage said locking discs at different positions in its path of movement to move said locking discs out of engagement with said control means at times,
a dial mechanism on the exterior of said housing and operatively secured to said crankshaft for selective movement thereof at times,
and groove means on the interior of said housing and containing said link means to define a path of movement for said link means whenever it is out of engagement with said locking discs,
said grooves defining a path for said link means so said link means can be moved from a position of disengagement from one locking disc to a position of engagement with a successive locking disc.

4. In a device of the class described,
a housing,
a switch in said housing and operatively electrically connected to an electrical circuit,
a control means movably mounted in said housing and having communication with the exterior thereof,
said control means adapted to be moved in said housing to actuate said switch at times,
axially aligned locking discs independently rotatably mounted in said housing and each adapted to engage said control means at times to limit the movement of said control means at times,
a U-shaped crankshaft rotatably mounted on said housing and adapted to rotate in spaced relation to the peripheries of said locking discs,
a link means slidably mounted on said crankshaft,
means of said crankshaft to yieldably urge said link means for slidable movement on said crankshaft in a direction perpendicular to the planes of said locking discs,
said link means adapted to engage each of said locking discs at different points along its slidable path on said crankshaft to independently rotate said locking discs when said crankshaft is rotated,
a dial mechanism on the exterior of said housing and operatively secured to said crankshaft for selective rotation thereof at times,
ratchet means in said housing,
ratchet notches in the peripheries of said locking discs to receive said ratchet means to hold said locking discs against rotation after said locking discs have been rotated predetermined increments by said crankshaft,
spring means operatively connecting said housing and said locking discs and said housing and said crankshaft to yieldingly resist rotational movement thereof,
means on said housing for engaging said ratchet means to disengage said ratchet means from said locking discs at times,
and grooves in said housing and containing said link means to define a path of movement for said link means when it is out of engagement with said locking discs,
said grooves defining a path for said link means so said link means can be moved from a position of disengagement from one locking disc to a position of engagement with a successive locking disc.

5. In a device of the class described,
a housing,
a control element in said housing and operatively connected to a control mechanism outside said housing,
a control means movably mounted in said housing and having communication with the exterior thereof,
said control means adapted to be moved in said housing to actuate said control element at times,
axially aligned locking discs independently rotatably mounted in said housing and each adapted to engage said control means at times to limit the movement of said control means at times,
a U-shaped crankshaft rotatably mounted on said housing and adapted to rotate in spaced relation to the peripheries of said locking discs,
a link means movably mounted on said crankshaft and adapted to successively engage said locking discs at different positions in its path of movement to move said locking discs out of engagement with said control means at times,
a dial mechanism on the exterior of said housing and operatively secured to said crankshaft for selective movement thereof at times,
and groove means on the interior of said housing and containing said link means to define a path of movement for said link means whenever it is out of engagement with said locking discs,
said grooves defining a path for said link means so said link means can be moved from a position of disengagement from one locking disc to a position of engagement with a successive locking disc.

6. In a device of the class described,
a housing,
a control element in said housing,
a control means movably mounted in said housing,
said control means adapted to be moved in said housing to actuate said control element at times,
locking means movably mounted in said housing and adapted to engage said control means at times to limit the movement of said control means at times,
a dial mechanism movably mounted on the outside of said housing,
yieldable means yieldably connecting said housing and said dial mechanism to resist the movement of said dial mechanism in one direction,
said yieldable means normally yieldably holding said dial mechanism in a predetermined position and normally returning said dial mechanism to this predetermined position whenever a displacing force on said dial mechanism has been removed,
and a means operatively connecting said dial and said locking means whereby the predetermined movement of said dial in said one direction will disengage said locking means from said control means.

7. In a device of the class described,
a housing,
a switch in said housing and operatively electrically connected to an electrical circuit,
a control means movably mounted in said housing,
said control means adapted to be moved in said housing to actuate said switch at times,
locking means movably mounted in said housing and adapted to engage said control means at times to limit the movement of said control means at times,
a dial mechanism movably mounted on the outside of said housing,
yieldable means yieldably connecting said housing and said dial mechanism to resist the movement of said dial mechanism in one direction, said yieldable means normally yieldably holding said dial mechanism in a predetermined position and normally returning said dial mechanism to this predetermined position whenever a displacing force on said dial mechanism has been removed, and a means operatively connecting said dial and said locking means whereby the predetermined movement of said dial in said one direction will disengage said locking means from said control means.

References Cited in the file of this patent

UNITED STATES PATENTS

| | | | |
|---|---|---|---|
| 2,363,854 | Bierenfeld | Nov. 28, | 1944 |
| 2,606,237 | Chase | Aug. 5, | 1952 |
| 2,832,856 | Goodhouse | Apr. 29, | 1958 |
| 2,916,570 | Nakamura | Dec. 8, | 1959 |